United States Patent [19]

Yang

[11] Patent Number: 4,756,542

[45] Date of Patent: Jul. 12, 1988

[54] SEPARABLE MULTIPLE-WHEEL CYCLE

[76] Inventor: Tzu-Tsan Yang, P.O. Box 13-118, Taipei, Taiwan

[21] Appl. No.: 43,803

[22] Filed: Apr. 29, 1987

[51] Int. Cl.$^4$ ............................................. B62K 15/00
[52] U.S. Cl. ..................................... 280/278; 280/287; 285/357; 403/341; 403/342
[58] Field of Search ................... 280/281 R, 287, 278; 403/341, 342, 343; 285/357

[56] References Cited

U.S. PATENT DOCUMENTS 1,394,866  10/1921  Schoenknecht ...................... 280/287
1,822,887   9/1931  Hagstedt .............................. 285/357

FOREIGN PATENT DOCUMENTS 19038   3/1930  Australia ............................. 403/342
29385   of 1897 United Kingdom ................. 280/287

Primary Examiner—John J. Love
Assistant Examiner—Mitchell J. Hill

[57] ABSTRACT

A seperable multiple-wheel cycle includes an upper coupler operatively coupling or uncoupling a left top-tube portion of a top tube secured toward a rear wheel and a right top-tube portion of a top tube secured toward a front wheel, a lower coupler operatively coupling or uncoupling a left down-tube portion of rear wheel and a right down-tube portion of a front wheel and a wire coupler also operatively coupling or uncoupling a first wire secured to a brake or clutch fixed on a rear wheel and a second wire secured to a lever fixed on a front handle bar, so that the couplers can be operated to uncouple the front-wheel part from a rear-wheel part for breakdown uses, or to couple the front part with the rear part for assembling a cycle for running purpose.

1 Claim, 2 Drawing Sheets 4,756,542

SEPARABLE MULTIPLE-WHEEL CYCLE

BACKGROUND OF THE INVENTION

Conventional collapsible bicycle is generally formed with a hinge means between a front wheel and a rear wheel so that the front wheel may be folded to superimpose on the rear wheel to reduced its volume for its convenient handling. However, such a hinge-operated collapsible bicycle has the following defects:

1. Even the two wheels can be folded to save its volume the front wheel part and the rear wheel part are still secured together so that, if any wheel part is damaged, it can not be withdrawn and replaced with a new one immediately to thereby possibly delay its maintenance.

2. When extending the two wheels from their folded position for riding service, there is easily vibrated or unstable at the hinged portion between the front wheel and the rear wheel so that a stronger reinforced fastening device must be further provided to stabilize the unfolded bike to thereby cause inconvenience for an user for such a fastening or retaining operation.

3. The position of the hinge means is pre-determined and so fixed that two wheel parts can not be separated in order for their optimum volume reduction when piling the folded bike parts for handling or storage purposes.

The present inventor has found the defects of a conventional collapsible bike and invented the present separable multiple-wheel cycle.

SUMMARY OF THE INVENTION

The object of the present invention is to provide a separable multiple-wheel cycle including an upper coupling means operative coupling or uncoupling a left top-tube portion and a right top-tube portion of a top tube and a lower coupling means operatively coupling or uncoupling a left down-tube portion and right down-tube portion of a down tube, so that both the top tube and the down tube can be uncoupled to separate a front wheel from a rear wheel of a multiple-wheel cycle such as a bike, adapted for convenient handling or storage of a cycle; or be coupled to be an assembled cycle for riding purpose.

DETAILED DESCRIPTION

Figure 1:
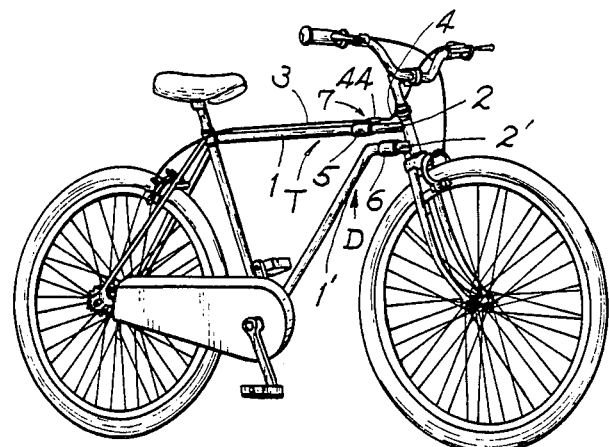
FIG. 1 is an illustration showing the present invention.
Figure 2:
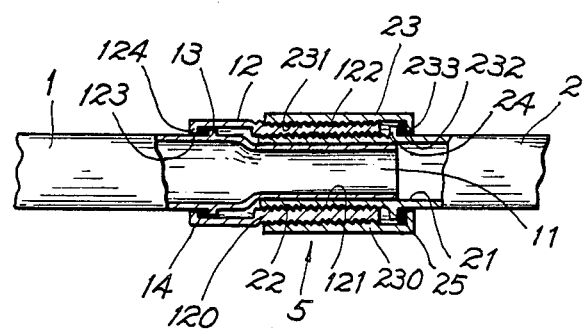
FIG. 2 is a sectional drawing of the coupling means of the tubes of the present invention.
Figure 3:
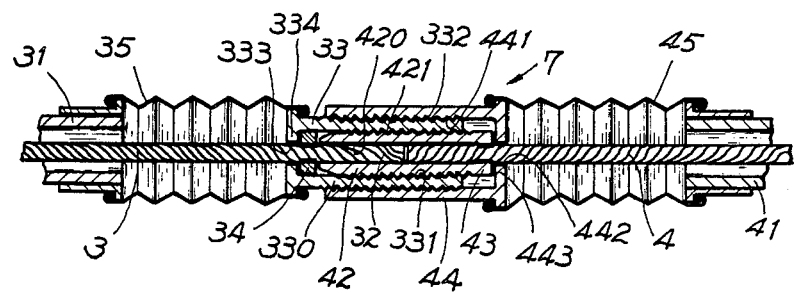
FIG. 3 shows a coupling means for a braking wire of the present invention.

As shown in FIGS. 1, 2 and 3, the present invention comprises: an upper coupling means 5 operatively coupling or uncoupling a left top-tube portion 1 and right top-tube portion 2 of a top tube of a cycle, a lower coupling means 6 operatively coupling or uncoupling a left down-tube portion 1' and a right down-tube portion 2' of a down tube of the cycle, and a wire coupler 7 coupling or uncoupling a first wire portion 3 and a second wire portion 4 of a braking or clutch wire of a cycle. The left tube portion 1 is secured toward the rear wheel whereas the right tube portion 2 is secured toward the front wheel.

Figure 4:
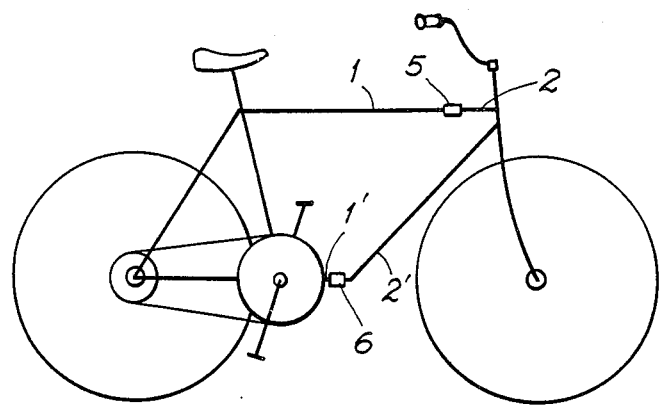
FIG. 4 is an illustration showing another application in accordance with the present invention.
Figure 5:
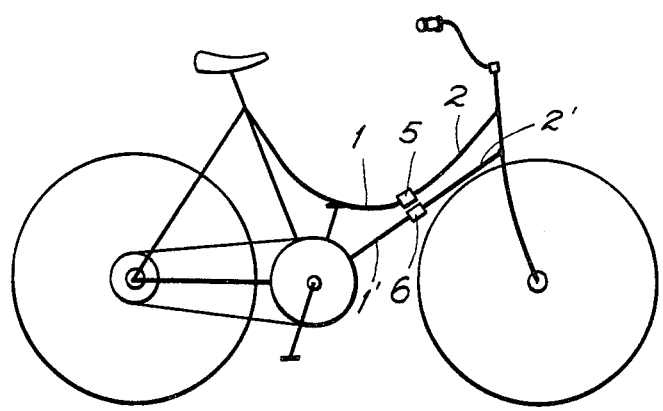
FIG. 5 shows still another application of the present invention.

The coupling means 5, 6 for top and down tubes can be all formed proximate to the front handle bar as shown in FIG. 1, or selectively formed as shown in FIG. 4 to have the upper coupling means 5 formed proximate to the front wheel and have the lower coupling means 6 formed proximate to the rear wheel, or formed on the intermediate positions of the two tubes as shown in FIG. 5. The wire coupler 7 can be optionally formed proximate to the upper coupling means 5 or to the lower means 6. Anyway, the upper coupling means 5 as coupled to the top tube should be parallel to the lower coupling means 6 as coupled to the down tube, suitably for their coupling or uncoupling operation.

The upper coupling means 5 has a structure as same as the lower coupling means 6 and includes, as shown in FIG. 2, a core tube 11 having a contracted diameter smaller than a diameter of a left top-tube portion 1 formed on the right end of tube 1, a female bore 21 formed inside a left end of a right top-tube portion 2 engageable with the core tube 11, a male-threaded portion 22 formed on the left end of the tube 2 corresponding to the inside bore 21, a first union 12 rotatably mounted on the left top-tube portion 1 as limited by a left lug 13 formed on tube 1 proximate to core tube 11 and having a female-threaded portion 121 formed inside a cylindrical casing 120 from a right end of the casing 120 adapted for engaging the male-threaded portion 22 of the right top-tube portion 2 and having a male-threaded portion 122 formed outside the casing 120 from the right end of casing 120, a second union 23 rotatably mounted on the right top-tube portion 2 as limited by a right lug 24 formed on tube 2 proximate to the male-threaded portion 22 and formed with a female-threaded portion 231 inside a cylindrical casing 230 from the left end of casing 230 adapted to engage with the male-threaded portion 122 of the first union 12.

The left end of casing 120 of first union 12 is formed with an annular disk 124 having a central hole 123 slidingly engaging with the left tube 1 and having a packing ring 14 formed inside the annular disk 124 to serve as a washer as rightwardly limited by the lug 13. The right end of casing 230 of second union 23 is formed with another annular disk 233 having a central hole 232 slidingly engaging with the right tube 2 and having a packing ring 25 formed inside the disk 233 to be a washer as leftwardly limited by the lug 24. The length of the core tube 11 is preferably at least two times of the diameter of the top tube 1 or 2.

The wire coupler 7 as shown in FIG. 3 includes: a first wire portion 3 movably jacketed with a first sheath 31 secured to a brake or clutch fixed at a rear wheel of the cycle having a free end portion 32 preferably having a length at least two times of the wire diameter and a left lug 34 formed on the first wire 3 proximate to the end portion 32; a coupler member 42 formed on the left end of a second wire portion 4 movably jacketed within a second sheath 41 secured to a brake or clutch lever provided on the front handle bar and having a female hole 420 formed on its left end engageable with the end portion 32 of first wire 3 and a male-threaded portion 421 formed on the left end of the coupler member 42 and a right extension 43 formed on the right end of the coupler 42; a first-wire union 33 which includes female-threaded portion 331 formed on a right end inside a cylindrical casing 330 engageable with the male-threaded portion 421 of the coupler member 42, a male-threaded portion 332 formed outside casing 330, and an annular disk 334 formed on the left end of casing 330 having a central hole 333 formed in the disk 334 rotatably jacketed on the wire 3 as limited by the lug 34 and rotatably secured to the sheath 31 by a first bellows 35 rotatably and telescopically secured between the union 33 and sheath 31; and a second-wire union 44 having a female-threaded portion 441 formed on a left end of a cylindrical casing 440 engageable with the male-threaded portion 332 and having an annular disk 443 formed on the right end of casing 440 and formed with a central hole 442 to rotatably jacket on the wire 4 as limited by the extension 43 and rotatably secured to the sheath 41 by a second bellows 45 rotatably and telescopically secured between the union 44 and sheath 41.

When intending to separate the front wheel from the rear wheel, the second union 23 is uncoupled from the first union 12 and the right tube 2 is separated from the left tube 1 to uncouple the upper coupling means 5 of the top tube and the lower coupling means 6 of the down tube is also uncoupled to thereby breakdown the present invention into a front-wheel part and a rear-wheel part along with the uncoupling of the wire coupler 7. Reversely, the top tube and the down tube as well as the brake (or clutch) wire can be coupled by firmly fastening all the coupling means 5, 6 and wire coupler 7 for normally running purpose.

The present invention has the following advantages superior to a conventional collapsible bicycle:

1. Each coupling means has two unions for its double fastening, ensuring the sturdy connection of each pair of left tube and right tube of either top tube or down tube of the cycle.

2. Whenever separating the front wheel from the rear wheel, all the wheels are completely separated and can be optionally piled or superimposed at an optimum volume-reduction, convenient for handling and storage.

3. If either front-wheel part or rear-wheel part is damaged, the damaged part can be withdrawn and replaced with a new one for quicker maintenance.

What is claimed is:

1. A separable multiple-wheel cycle comprising:
   an upper coupling means operatively coupling or uncoupling a left top-tube portion of a top tube secured toward a rear wheel and a right top-tube portion of a top tube secured toward a front wheel;
   a lower coupling means operatively coupling or uncoupling a left down-tube portion secured toward the rear wheel and a right down-tube portion secured toward a front wheel; and
   a wire coupler operatively coupling or uncoupling a first wire portion secured to a brake or a clutch fixed on a rear wheel and a second wire portion secured to a brake or clutch lever on a front handle bar, the upper coupling means as coupled to said top tube being parallel to the lower coupling means as coupled to said down tube, the improvement which comprises:

said upper coupling means including: a core tube having a contracted diameter smaller than a diameter of the left top-tube portion formed on the right end of the left top-tube portion, a female bore formed inside a left end of the right top-tube portion engageable with the core tube, a male-threaded portion formed on the left end of the right top-tube portion corresponding to the inside bore, a first union rotatably mounted on the left top-tube portion as limited by a left lug formed on said left top-tube portion proximate to the core tube and having a female-threaded portion formed inside a cylindrical casing from a right end of the first union adapted for engaging the male-threaded portion of the right top-tube portion and having a male-threaded portion formed outside the casing from the right end of the first union, and a second union rotatably mounted on the right top-tube portion as limited by a right lug formed on the right-tube portion proximate to the male-threaded portion outside the bore and formed with a female-threaded portion inside a cylindrical casing from the left end of the second union adapted to engage with the male-threaded portion of the first union, the length of said core tube being at least two times of the diameter of said top-tube portion; and said wire coupler including: a first wire portion movably jacketed within a first sheath secured to a brake or clutch fixed at a rear wheel of the cycle having a free end portion preferably having a length at least two times of the wire diameter and a left lug formed on the first wire proximate to its end portion; a coupler member formed on the left end of a second wire portion movably jacketed within a second sheath secured to a brake or clutch lever provided on the front handle bar, including a female hole formed on its left end engageable with the end portion of the first wire, a male-threaded portion formed on the left end of the coupler member, and a right extension formed on the right side of the coupler; a first-wire union having a female-threaded portion formed on a right end inside a cylindrical casing of the first-wire union engageable with the male-threaded portion of the coupler member and having a male-threaded portion formed outside the casing, rotatably jacketed on the first wire as limited by a left lug and rotatably secured to the first sheath by a first bellows rotatably and telescopically secured between the first-wire union and the first sheath; and
   a second-wire union having a female-threaded portion formed on a left end of a cylindrical casing of the second union engageable with the male-threaded portion of the first union and rotatably jacketed on the second wire portion as limited by a right extension and rotatably secured to a second sheath by a second bellows rotatably and telescopically secured between the second union and the second sheath.

* * * * *